United States Patent
Anderson

(10) Patent No.: US 7,640,121 B2
(45) Date of Patent: Dec. 29, 2009

(54) SYSTEM AND METHOD FOR DISAMBIGUATING THE PHASE OF A FIELD RECEIVED FROM A TRANSMITTER IN AN ELECTROMAGNETIC TRACKING SYSTEM

(75) Inventor: Peter Traneus Anderson, Andover, MA (US)

(73) Assignee: General Electric Company, Schenectady, NY (US)

(*) Notice: Subject to any disclaimer, the term of this patent is extended or adjusted under 35 U.S.C. 154(b) by 654 days.

(21) Appl. No.: 11/290,117

(22) Filed: Nov. 30, 2005

(65) Prior Publication Data

US 2007/0164895 A1    Jul. 19, 2007

(51) Int. Cl.
*G01R 13/00* (2006.01)
*G01S 3/02* (2006.01)

(52) U.S. Cl. .................. 702/66; 324/207.17; 324/521; 342/450; 702/75

(58) Field of Classification Search .................. 702/57, 702/66, 112, 124; 701/200, 213; 324/207.17, 324/207.18, 521; 342/372, 448, 450; 455/41.1; 600/407, 424, 426; 606/113
See application file for complete search history.

(56) References Cited

U.S. PATENT DOCUMENTS

| | | |
|---|---|---|
| 3,983,474 A | 9/1976 | Kuipers |
| 4,054,881 A | 10/1977 | Raab |
| 4,186,338 A * | 1/1980 | Fichtenbaum ............... 324/521 |
| 5,251,635 A | 10/1993 | Dumoulin et al. |
| 5,443,066 A | 8/1995 | Dumoulin et al. |
| 5,676,673 A | 10/1997 | Ferre et al. |
| 5,747,996 A | 5/1998 | Fuchs |
| 5,803,089 A | 9/1998 | Ferre et al. |
| 5,829,444 A | 11/1998 | Ferre et al. |
| 5,873,822 A | 2/1999 | Ferre et al. |
| 5,967,980 A | 10/1999 | Ferre et al. |
| 6,073,043 A | 6/2000 | Schneider |
| 6,175,756 B1 | 1/2001 | Ferre et al. |
| 6,341,231 B1 | 1/2002 | Ferre et al. |
| 6,369,564 B1 * | 4/2002 | Khalfin et al. ......... 324/207.17 |
| 6,445,943 B1 | 9/2002 | Ferre et al. |
| 6,490,475 B1 | 12/2002 | Seeley et al. |
| 6,636,757 B1 | 10/2003 | Jascob et al. |
| 6,774,624 B2 | 8/2004 | Anderson et al. |
| 6,856,826 B2 | 2/2005 | Seeley et al. |
| 6,856,827 B2 | 2/2005 | Seeley et al. |

(Continued)

*Primary Examiner*—John H Le
(74) *Attorney, Agent, or Firm*—McAndrews, Held & Malloy, Ltd.; Peter J. Vogel; Michael A. Dellapenna

(57) ABSTRACT

The present invention provides for disambiguating the phase of a field received from a wireless tracker in an electromagnetic ("EM") tracking system. In a first method, a carrier wave signal is modulated with a tracking signal transmitted by an EM tracker. A time reference indicating a starting point for a particular phase of the carrier wave signal is determined and is used to determine the proper phase for the tracking signal. In a second method, the EM tracker transmits auxiliary data that includes the proper phase of the tracking signal. In a third method, the EM tracker includes a passive transponder that receives a desired phase of a tracking signal as auxiliary data in an excitation signal. In response, the EM tracker transmits the tracking signal according to the desired phase. Tracking electronics may then lock onto the proper or desired phase determined according to any of the disclosed methods.

20 Claims, 6 Drawing Sheets

U.S. PATENT DOCUMENTS 7,015,859 B2 * 3/2006 Anderson .................. 342/450
2005/0003757 A1 1/2005 Anderson
2005/0012597 A1 1/2005 Anderson

* cited by examiner

SYSTEM AND METHOD FOR DISAMBIGUATING THE PHASE OF A FIELD RECEIVED FROM A TRANSMITTER IN AN ELECTROMAGNETIC TRACKING SYSTEM

BACKGROUND OF THE INVENTION

The present invention generally relates to an electromagnetic ("EM") tracking system. In particular, the present invention relates to a system and method for disambiguating the phase of a field received from a transmitter in an EM tracking system.

Medical practitioners, such as doctors, surgeons, and other medical professionals, often rely upon technology when performing a medical procedure, such as image-guided surgery ("IGS") or examination. An IGS system may provide positioning and/or orientation ("P&O") information for the medical instrument with respect to the patient or a reference coordinate system, for example. A medical practitioner may refer to the IGS system to ascertain the P&O of the medical instrument when the instrument is not within the practitioner's line of sight with regard to the patient's anatomy, or with respect to non-visual information relative to the patient. An IGS system may also aid in pre-surgical planning.

The IGS or navigation system allows the medical practitioner to visualize the patient's anatomy and track the P&O of the instrument. The medical practitioner may use the tracking system to determine when the instrument is positioned in a desired location or oriented in a particular direction. The medical practitioner may locate and operate on, or provide therapy to, a desired or injured area while avoiding other structures. Increased precision in locating medical instruments within a patient may provide for a less invasive medical procedure by facilitating improved control over smaller, flexible instruments having less impact on the patient. Improved control and precision with smaller, more refined instruments may also reduce risks associated with more invasive procedures such as open surgery.

In medical and surgical imaging, such as intraoperative or perioperative imaging, images are formed of a region of a patient's body. The images are used to aid in an ongoing procedure with a surgical tool or instrument applied to the patient and tracked in relation to a reference coordinate system formed from the images. Image-guided surgery is of a special utility in surgical procedures such as brain surgery and arthroscopic procedures on the knee, wrist, shoulder or spine, as well as certain types of angiography, cardiac procedures, interventional radiology and biopsies in which x-ray images may be taken to display, correct the P&O of, or otherwise navigate a tool or instrument involved in the procedure.

Generally, image-guided surgery systems operate with an image display which is positioned in a surgeon's field of view and which displays a few panels such as a selected MRI image and several x-ray or fluoroscopic views taken from different angles. In tool navigation systems, the display visible to the surgeon may show an image of a surgical tool, biopsy instrument, pedicle screw, probe or other device projected onto a fluoroscopic image, so that the surgeon may visualize the orientation of the surgical instrument in relation to the imaged patient anatomy. An appropriate reconstructed CT or MRI image, which may correspond to the tracked coordinates of the probe tip, may also be displayed.

Among the systems that have been proposed for effecting such displays, many rely on closely tracking the position and orientation of the surgical instrument in external coordinates. The various sets of coordinates may be defined by robotic mechanical links and encoders, or more usually, are defined by a fixed patient support, two or more receivers such as video cameras which may be fixed to the support, and a plurality of signaling elements attached to a guide or frame on the surgical instrument that enable the position and orientation of the tool with respect to the patient support and camera frame to be automatically determined by triangulation, so that various transformations between respective coordinates may be computed.

The highly accurate tracking technology found in navigation systems may also be used to track the P&O of items other than medical instruments in a variety of applications. That is, a tracking system may be used in other settings where the P&O of an object in an environment is difficult to accurately determine by direct or indirect inspection. For example, tracking technology may be used in forensic or security applications. Retail stores may use tracking technology to prevent theft of merchandise. In such cases, a passive transponder may be located on the merchandise. A transmitter may be strategically located within the retail facility. The transmitter emits an excitation signal at a frequency that is designed to produce a response from a transponder. When merchandise carrying a transponder is located within the transmission range of the transmitter, the transponder produces a response signal that is detected by a receiver. The receiver then determines the location of the transponder based upon characteristics of the response signal.

Tracking systems are also often used in virtual reality systems or simulators. Tracking systems may be used to monitor the position of a person in a simulated environment. A transponder or transponders may be located on a person or object. A transmitter emits an excitation signal and a transponder produces a response signal. A receiver detects the response signal. The signal emitted by the transponder may then be used to monitor the position of a person or object in a simulated environment.

Tracking systems may be optical, ultrasonic, inertial, or electromagnetic, for example. Electromagnetic tracking systems may employ coils as receivers and transmitters. In EM trackers, transmitter coil or coils emit quasi-static magnetic fields. In addition, receiver coil(s) measure these fields. From the field measurements and mathematical models of the coils, the position and orientation of the receiver with respect to the transmitter can be determined. Alternatively, the position and orientation of the transmitter with respect to the receiver is determined.

Typically, an electromagnetic tracking system is configured in an industry-standard coil architecture ("ISCA"). ISCA trackers use a trio of nearly-colocated, nearly-orthogonal, nearly-dipole coils for the transmitter and another trio of nearly-colocated, nearly-orthogonal, nearly-dipole coils for the receiver. Each coil trio is carefully characterized during manufacture to numerically express the precise value of the "nearly" in the previous sentence. From the field measurements and mathematical models of the coils, the position and orientation of the receiver with respect to the transmitter is determined. Alternatively, the position and orientation of the transmitter with respect to the receiver is determined. All six degrees of freedom (three of position and three of orientation) are tracked.

Single-coil EM trackers use a single dipole or nearly-dipole transmitter coil and an array of six or more receiver coils, or else use a single dipole or nearly-dipole receiver coil and an array of six or more transmitter coils. By electromagnetic reciprocity, these two arrangements function equivalently. The coils in the array may be dipole, nearly-dipole, or non-dipole coils (or combinations). The coils in the array are either precisely manufactured or precisely characterized during manufacture to obtain mathematical models of the coils in the array. The single coil does not need to be characterized. From the field measurements and mathematical models, the position and orientation of the single coil with respect to the array are tracked. Since the single coil is symmetrical about its roll axis, only five degrees of freedom (six of position and two of orientation) of position and orientation are tracked. The gain of the single coil can also be tracked.

The array of coils can be fabricated as a printed-circuit board or as an array of wound coils or as a combination of both. Arrangements of coils in the array vary widely in various implementations of single-coil EM trackers. The array may include electrically-conductive or ferromagnetic materials as part of the design of the array.

In an EM system that includes a single-coil transmitter and an array of receiver coils, the tracked outputs typically include position, orientation (without roll information), and gain of the single-coil transmitter. The single-coil transmitter can be made wireless by including a self-contained oscillator in the transmitter that drives the coil to produce a sinewave EM field.

The wireless transmitter coil can be small enough to be approximated as a dipole coil. Such a dipole coil can have a defined dipole magnetic moment vector. For a sinewave excitation, the dipole moment vector is approximated in Equation #1 as:

$$M = M_0 \sin(2\pi \cdot F \cdot t) \quad (1)$$

where M is the dipole moment vector as a function of time, $M_0$ is the dipole moment positive peak value vector, F is the frequency of oscillation of the wireless transmitter coil, and t is time. FIG. 1 illustrates an example graph 100 of the dipole moment vector 130 for a wireless transmitter coil in accordance with an embodiment of the presently described technology. Graph 100 includes a y-axis 110 representative of M as defined above by Equation #1, an x-axis 120 representing various radians, and a curve 130 representative of M at various radians in the above Equation #1. As illustrated in FIG. 1, during a phase defined by 0 to π (or 0° to 90°), the dipole magnetic moment vector transmitted by the wireless transmitter coil is positive. During the phase defined by π to 2π, the dipole magnetic moment vector transmitted by the wireless transmitter coil is negative.

Current EM tracking systems include tracker electronics, or a receiver signal-processing system. The tracker electronics must phase-lock onto the sinewave transmitted by the wireless transmitter. The tracker electronics may then use the sinewave transmitted by the wireless transmitter to determine the position and orientation of the wireless transmitter.

One major difficulty with current systems and methods for tracking positions and orientations of wireless transmitters is confusion between two similar mechanical configurations of a wireless transmitter. Specifically, suppose a wireless transmitter in an EM system is at some position and orientation with respect to one or more receivers. This position and orientation is the first mechanical configuration. Suppose also that the phase-locking hardware or software of the system acquires the signal emitted by the wireless transmitter (referred to as a "tracking signal"). The position and orientation of the transmitter may then be calculated based on this signal. This may be referred to as the first tracked position and orientation. The trackin .g signal emitted by the transmitter may be approximately that shown in FIG. 1.

If the wireless transmitter coil is then rotated end-for-end, without otherwise changing the coil's position or orientation, then the wireless transmitter is placed into a second mechanical configuration. The tracking signal transmitted by the wireless transmitter changes to approximately that shown in FIG. 2. FIG. 2 illustrates an example graph 200 of the dipole moment vector 230 for the wireless transmitter coil in the second mechanical configuration in accordance with an embodiment of the presently described technology. Graph 100 includes a y-axis 110 representative of M as defined above by Equation #1, an x-axis 120 representative of time, and a curve 230 representative of M at various times in the above Equation #1. As illustrated in FIG. 2, during a phase defined by 0 to π (or 0° to 180°), the dipole magnetic moment vector transmitted by the wireless transmitter coil is negative. During the phase defined by π to 2π (or 180° to 360°), the dipole magnetic moment vector transmitted by the wireless transmitter coil is positive.

In the second mechanical configuration, the tracking signal is essentially the same as that for the first mechanical configuration but with the sign of the gain of the transmitter coil changed. In other words, the effect is essentially that of multiplying $M_0$ by −1.

In the second mechanical configuration, phase-locking again occurs. However, current systems and methods phase-lock on the tracking signal of the second mechanical configuration, but out-of-phase. Specifically, current systems and methods lock on to the signal of the second mechanical configuration at 180° (or π) out of phase with respect to the phase-lock on the signal from the first mechanical configuration. The end result is that the two mechanical configurations have the same dipole moment vector M (or the same received mutual-inductance or field measurements). In other words, current systems and methods measure the dipole moment vector of the first mechanical configuration by locking on to the phase starting at 0° (or 0) while locking on to the phase of the second mechanical configuration at 180° (or π). Therefore, current systems and methods determine the same position and orientation for both the first and second mechanical configurations.

Thus, a need exists for a system and method for distinguishing between these two mechanical configurations. Such a system and method disambiguates the sign of the gain of the wireless transmitter coil. Previous systems and methods may cause the transmitter to emit some field at the second harmonic of the sinewave oscillation. The received second harmonic is then used to disambiguate the sign of the gain of the transmitter coil.

However, in some applications, there is insufficient spectrum available to permit dedicating the second harmonic to gain-sign disambiguation. For example, frequencies close to the second harmonic may already be used by other transmitters. In addition, using the second harmonic may not be possible in cases where the transmitter frequency has been made as low as possible to eliminate field distortion due to eddy currents in nearby electrically conductive objects.

Therefore, a need exists for a system and method for disambiguating the phase of a field received from a transmitter in an EM tracking system. Such a system and method permits the accurate tracking of positions and orientations of a transmitter that differ by rotating the transmitter end-for-end.

BRIEF SUMMARY OF THE INVENTION

The presently described technology provides a method of disambiguating the phase of a field received from a wireless tracker in an electromagnetic ("EM") tracking system. The method includes transmitting a tracking signal, determining a starting point of a phase of the tracking signal, locking onto the phase of the tracking signal at the starting point, and measuring an EM field of the tracking signal based on the starting point of the phase.

The presently described technology also provides an electromagnetic ("EM") tracking system configured to disambiguate the phase of a field received from a wireless tracker. The system includes an EM tracker, one or more single-coil EM receivers, and tracker electronics. The EM tracker is configured to transmit a tracking signal. The single-coil EM receivers are included in an array of single-coil EM receivers and are configured to measure an EM field of the tracking signal. The tracker electronics are configured to determine a starting point of a phase of the tracking signal, lock onto the phase of the tracking signal based on the starting point, and determine a position and orientation of the single-coil EM tracker based on the EM field of the tracking signal.

The presently described technology also provides a tracking apparatus for use in an electromagnetic ("EM") tracking system. The tracking apparatus is configured to lock on to a phase of a tracking signal transmitted by an EM tracker. The phase is determined by one or more of the steps of: (1) analyzing a carrier wave signal transmitted by the EM tracker to determine a time at which a desired phase of the carrier wave signal begins, where the time also indicates a starting point of the phase of the tracking signal; (2) receiving the phase of the tracking signal as transmitted by the EM tracker; and (3) communicating the phase of the tracking signal to a transmitter configured to transmit the phase to the EM tracker, where the EM tracker is configured to receive the phase and transmit the tracking signal beginning at the phase.

Figure 1:
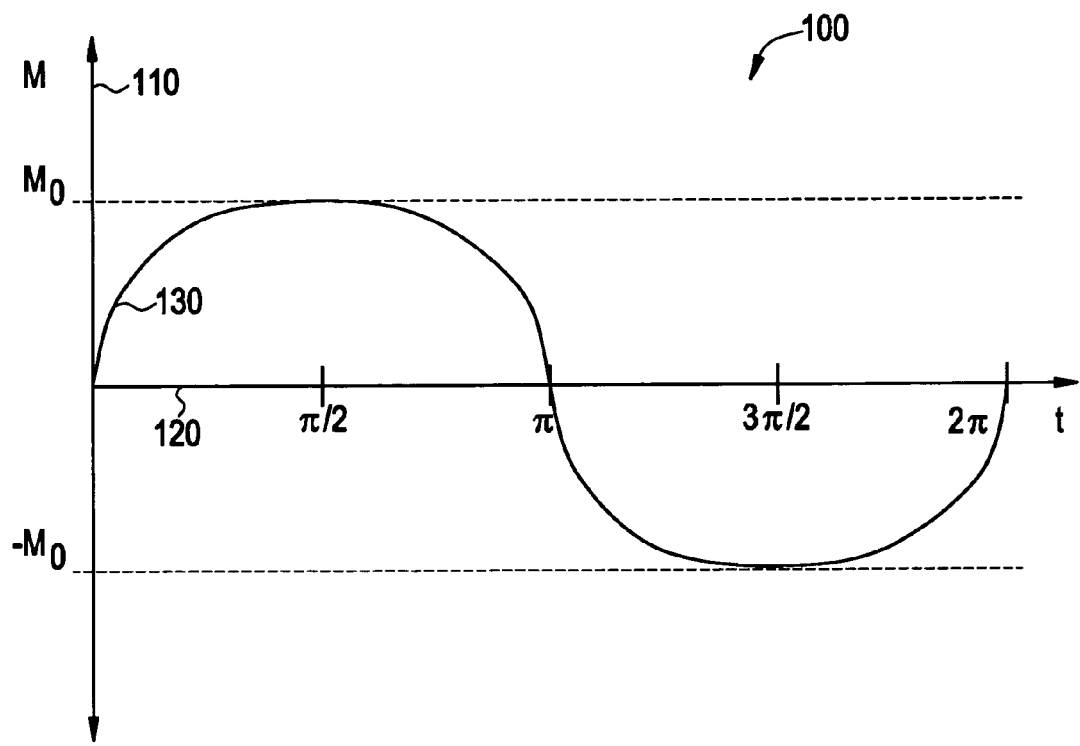
FIG. 1 illustrates an example graph of the dipole moment vector for a wireless transmitter coil in accordance with an embodiment of the presently described technology.

The foregoing summary, as well as the following detailed description of certain embodiments of the presently described technology, will be better understood when read in conjunction with the appended drawings. For the purpose of illustrating the presently described technology, certain embodiments are shown in the drawings. It should be understood, however, that the presently described technology is not limited to the arrangements and instrumentality shown in the attached drawings.

DETAILED DESCRIPTION OF THE INVENTION

Figure 3:
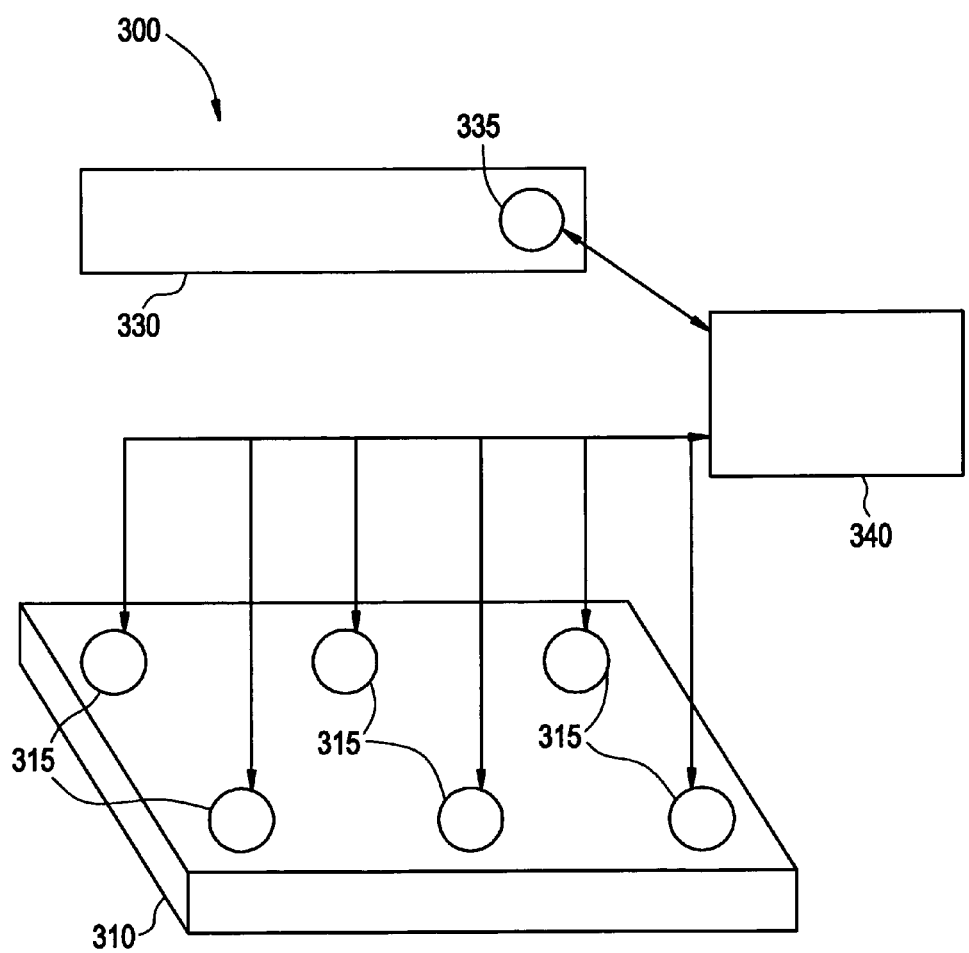
FIG. 3 illustrates an electromagnetic ("EM") tracking system used in accordance with an embodiment of the presently described technology.

FIG. 3 illustrates an electromagnetic ("EM") tracking system 300 used in accordance with an embodiment of the presently described technology. System 300 includes an array of single-coil receivers 315, an EM tracker 335, and tracker electronics or a tracking apparatus 340. While a single EM tracker 335 is shown in FIG. 1, any number of EM trackers 335 may be used in accordance with various embodiments of the presently described technology. The illustration of a single EM tracker 335 in FIG. 1 is not intended to limit the scope of any embodiment of the presently described technology.

In an embodiment, EM tracker 335 is a wireless transmitter. For example, EM tracker 335 may be a single-coil wireless EM transmitter. In another embodiment, EM tracker 335 may be a wired transmitter. EM tracker 335 may also be a sensor including additional electronics and capable of transmitting a signal through another object, such as a medical instrument or a combination of a medical instrument and a human body. For example, EM tracker 335 may be a sensor employing a gyroscope or accelerometer.

In another embodiment, EM tracker 335 includes a transponder capable of transmitting a field as a dipole moment vector upon receiving an excitation signal transmitted by another transmitter. The transponder is capable of transmitting the field as a dipole moment vector beginning at a given or desired phase, for example.

EM tracker 335 can be mounted on an object 330 being navigated using system 300 such as a surgical instrument or implant. For example, EM tracker 335 may be attached to a tip of a reducing rod, a drill bit, debrider blade, or a guidewire. Similarly, EM tracker 335 may be attached to an artificial hip or knee implant. EM tracker 335 may be added to an existing object 330 by wrapping a wire coil around a component of the device where tracking is desired to create an EM coil, for example. In order to reduce interference from the material of object 330, EM tracker 335 may be partially formed by wrapping a wire coil around object 330, thereby protecting the EM field from a source of interference.

EM tracker 335 may be connected to object 330 by embedding transmitting in object 330. For example, during the production of a reducing rod, drill bit, guidewire, artificial hip or artificial knee, pedicle screw, artificial disk, or the like, EM tracker 335 may be embedded into materials used to create the instrument or implant. By embedding EM tracker 335, it may be fixed in a given location within a device and therefore be resistant to movement independent of the device. However, other factors may require the embedding of EM tracker 335 into a medical device.

The array of single-coil receivers 315 includes a plurality of single-coil EM receivers. The single-coil receivers 315 may be mounted on a device 310 in system 300. Device 310 can include any object capable of being fitted with an array of single-coil receivers. For example and in an embodiment of the presently described technology, device 310 can include any object used to image a portion of a patient anatomy. For example, device 310 can include an x-ray detector or a surgical microscope. In another embodiment, device 310 can include a surface upon which a patient anatomy is positioned, such as a medical table.

In an embodiment, one or more single-coil receivers 315 in the array are single-coil dipole receivers. In another embodiment, one or more single-coil receivers 315 in the array are single-coil nearly-dipole receivers. In another embodiment, one or more single-coil receivers 315 in the array are single-coil non-dipole receivers. In another embodiment, the array includes a combination of one or more single-coil dipole, nearly-dipole and/or non-dipole receivers.

In an embodiment, one or more single-coil receivers 315 may be wireless receivers. Wireless receivers may draw power from device 310 on which receivers 315 are attached or embedded or may have a separate power source, for example. However, use of a battery as a power source may result in interference to system 300. In order to reduce this interference, receivers 315 may be partially formed by wrapping a wire coil around the power source, or battery, thereby protecting the EM field from the source of interference. Other sources of energy for receivers 315 may include induction or piezoelectric generation, for example.

In another embodiment, one or more receivers 315 may be wired receivers. Data may be communicated over a wired connection between one or more receivers 315 and tracker electronics 340. In another embodiment, power may be supplied to one or more receivers 315 via the wired connection.

In an embodiment, the array of single-coil receivers 315 includes six single-coil receivers. In another embodiment, the array may include a plurality of single-coil receivers 315 other than six receivers 315.

In an embodiment, one or more of the single-coil receivers 315 in the array are mounted on device 310. For example, one or more of the single-coil receivers 315 in the array may be removably attached on device 310.

In an embodiment, one or more of the single-coil receivers 315 in the array are integrated into device 310. For example, during manufacture of device 310, one or more single-coil receivers 315 may be inserted into the material forming a portion of device 310.

The array of single-coil receivers 315 may be mounted or integrated in device 310 in such a way so as to fit into the mechanical space available on or in device 310. For example, due to requirements of device 310, receivers 315 may only be able to be mounted or integrated into device 310 along an external perimeter of device 310. In an example of an x-ray detector as device 310, receivers 315 may be mounted on or integrated in the outer edge of the detector so as not to interfere with an imaging area in the center of the detector.

In an embodiment, the array of receivers 315 may include a printed circuit board. For example, a printed circuit board may be fabricated so as to include one or more single-coil receivers 315. The array of single-coil receivers 315 may then be formed by a printed circuit board that includes a plurality of single-coil receivers 315, a plurality of such printed circuit boards, and/or a combination of single-coil receivers 315 and printed circuit boards that include single-coil receivers 315.

In an embodiment, device 310 may be formed of electrically-conductive and/or ferromagnetic materials. Such materials can distort magnetic fields near device 310. However, the field of distortion caused by device 310 can be determined by methods known to those of skill in the presently described technology. Once this field is known, the field may be included in a model of magnetic fields and distortions within and/or affecting system 300. In such a scenario, the distortion field caused by device 310 may be incorporated into the model of system 300. Therefore, the distorting effects of device 310 may be minimized and/or eliminated from the tracking of one or more EM trackers 325 with respect to the array of single-coil receivers 315.

Tracker electronics 340 includes any device capable of and/or configured to track a position and/or orientation of EM tracker 335 with respect to the array of single-coil receivers 315. In an embodiment, the connection between EM tracker 335 and tracker electronics 340 is a wireless connection over which data is transmitted. In another embodiment, a connection between EM tracker 325 and tracker electronics 340 is a wired connection over which data is transmitted.

In an embodiment, connections between each of the array of single-coil receivers 315 and tracker electronics 340 is a wired connection over which data is transmitted. In another embodiment, connections between each of the array of single-coil receivers 315 and tracker electronics 340 is a wireless connection over which data is transmitted.

In operation, EM tracker 335 emits quasi-static magnetic fields. For example, the single coil of a single-coil EM transmitter 335 (as EM tracker 335) may emit a magnetic field. One or more receiver coils of the array of single-coil receivers 315 measure this field. The field measurements are communicated from one or more of the single-coil receivers 315 to tracker electronics 340. From the field measurements, the position and/or orientation of EM transmitter 335 with respect to the array of single-coil receivers 315 is determined.

In an embodiment, one or more mathematical models of magnetic field interference(s) may also be used by tracker electronics 340 to determine the position and/or orientation of the array of single-coil receivers 315 with respect to EM tracker 335 or the position and/or orientation of EM tracker 335 with respect to the array of single-coil receivers 315. As described above, in an embodiment, the mathematical model(s) may include a model of magnetic field interference(s) caused by device 310.

In an embodiment, tracker electronics 340 may include a large number of transmitter coil drivers (to accommodate a large number of transmitter coils used simultaneously, for example). Tracker electronics 340 may also include a modular design permitting additional transmitter coil drivers to be added based on a type of coil architecture in use. Wireless transmitters have no direct, physical connection with the system 300 and may be added to tracker electronics 340 with minimal effort.

Waveforms for transmitter coil drivers may be stored in a computer-readable memory, such as a random access memory (RAM) or hard disk drive, or may be generated on-the-fly by a software-controlled signal generator, such as a direct digital synthesizer (DDS), for example. Driver waveforms may be changed for different coil architectures by changing data in the RAM or other memory storing the waveforms or by adjusting settings of the software-controlled generator.

Driver waveforms may be distinguished using sine waves of different frequencies, for example. A similar effect may be accomplished by using waveforms that are nonzero at different times or by using a spread-spectrum code division technique.

Tracker electronics 340 may include a large number of receiver coil preamplifier channels (to accommodate a large number of receiver coils used simultaneously, for example). Alternatively, tracker electronics 340 may include a modular design allowing additional receiver coil drivers to be added based on a coil architecture(s) in use. Wireless receiver coil preamplifer channels may be added as well.

Signals emitted from receiver preamplifiers may be transmitted to analog-to-digital converters (ADCs). The ADCs can digitize the receiver preamplifier signals. Digital signals output from the ADCs are processed by one or more sets of instructions for a computer stored on a computer-readable storage medium. The set(s) of instructions may be embodied in one or more computer software applications, for example.

In an embodiment, the software is stored in RAM or other memory. The software extracts desired frequency components of the digital signals. The frequency components may be further processed to calculate the position and orientation of the receiver assembly or assemblies, for example.

As described above, in order to measure a magnetic field emitted by EM tracker 335, tracker electronics 340 locks on to a phase of the magnetic dipole vector of the field emitted or transmitted by EM tracker 335. However, if EM tracker 335 is positioned and oriented in two mechanical configurations (first and second mechanical configurations, as described above), tracker electronics 340 phase locks onto one mechanical configuration at a first phase and onto the second mechanical configuration at a second phase. As described above, the second phase may be 180° out of phase with respect to the first phase. Therefore, tracker electronics 340 may measure the same mutual inductance or field measurements (and therefore position and orientation of EM tracker 335) for both the first and second mechanical configurations, even though the orientation of the two configurations differs.

In an embodiment, in order to distinguish between the first and second mechanical configurations, EM tracker 335 emits a magnetic field (or "tracking signal" or tracking transmitter frequency waveform, as described above) at a first frequency and a carrier wave signal at a second frequency. In a preferred embodiment, the carrier wave signal is transmitted at a higher frequency than the tracking signal.

In accordance with an embodiment of the presently described technology, EM tracker 335 modulates the carrier wave with the tracking signal. In operation, while the carrier wave signal may be distorted by eddy currents in nearby electrically-conductive objects, as long as enough carrier wave field exists at one or more receivers 315 to give an adequate signal-to-noise ratio, this distortion is irrelevant. More specifically, this distortion is unimportant as tracker electronics 340 do not track a position and orientation of EM tracker 335. Instead, tracker electronics 340 only monitor the carrier wave to determine a time reference.

In an embodiment, the time reference is a point in time at which a particular or desired phase of the carrier wave signal occurs or begins. For example, the carrier wave signal may be approximated or represented by a sinusoidal waveform such as that represented by Equation #1, as described above. Tracker electronics 340 may determine a point in time at which the waveform of the carrier wave signal is positive. For example, if the waveform of the carrier wave signal is represented by curve 130 of FIG. 1, tracker electronics 340 may determine a time reference as the time at which curve 130 is positive. In other words, the time reference may be the time at which the phase between 0 and $\pi$ begins.

However, the time reference may be any point in time at which any phase or any portion of a phase, begins or ends. In other words, tracker electronics 340 may determine the time reference to occur at any repeating time that is correlated to a phase (or portion thereof) of a waveform of a carrier wave signal. The various embodiments of the presently described technology are not limited to the sinusoidal waveform described above.

Once tracker electronics 340 has determined the time reference, tracker electronics 340 locks onto the phase of the tracker signal transmitted by EM tracker 335. For example, if tracker electronics 340 determines a time reference from a carrier wave signal that indicates that tracker electronics 340 should lock onto the phase of the tracker signal from EM tracker 335 beginning at 0 (radians or degrees, for example), then tracker electronics 340 locks onto the tracker signal phase at 0 radians or degrees. The time reference may therefore be thought of as a starting point for the correct phase of the tracking signal (that tracker electronics 340 should phase lock on to).

For example, EM tracker 335 in the first mechanical configuration (described above) may emit a tracking signal in a waveform represented by curve 130 in FIG. 1. EM tracker 335 may also emit a carrier wave signal as described above. Tracker electronics 340 may then determine, based on the demodulated carrier wave signal, that it should lock onto the phase of the tracking signal beginning at 0. Tracker electronics 340 then determines the position and orientation of EM tracker 335 based on the tracking signal that is phase-locked on the phase beginning at 0.

Figure 2:
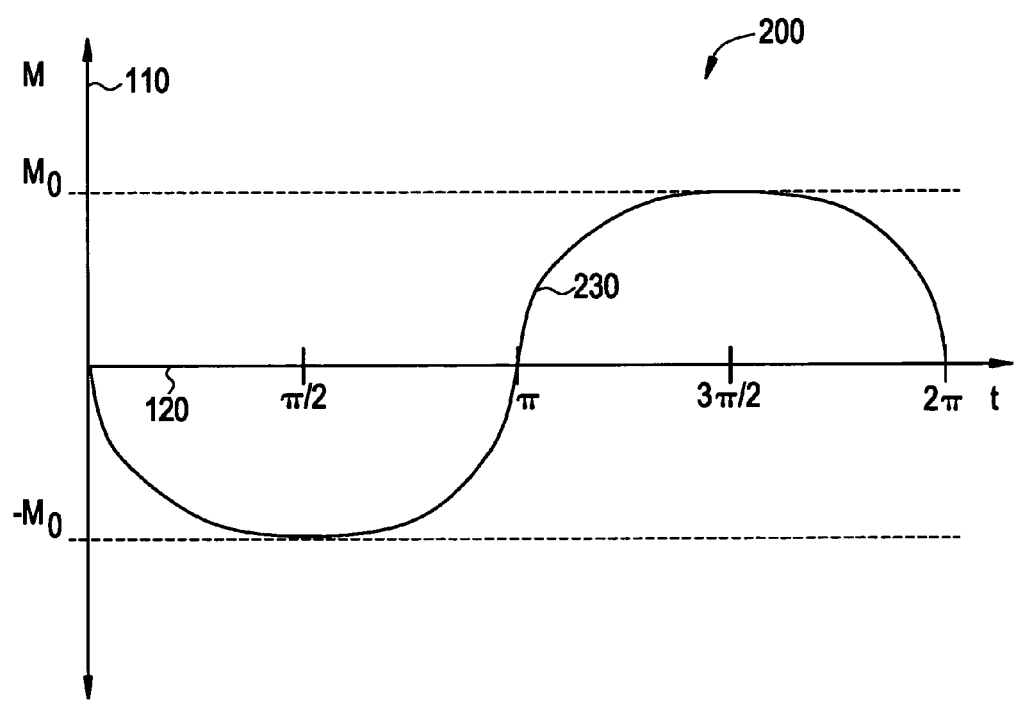
FIG. 2 illustrates an example graph of the dipole moment vector for the wireless transmitter coil in the second mechanical configuration in accordance with an embodiment of the presently described technology.

If EM tracker 335 is then moved to the second mechanical configuration (that is, rotated end-for-end, as described above), the tracking signal transmitted may be in the waveform represented by curve 230 in FIG. 2. Tracker electronics 340 again determines, based on the demodulated carrier wave signal transmitted by EM tracker 335, that it should lock onto the phase of the tracking signal beginning at 0. Tracker electronics 340 then determines the position and orientation of EM tracker 335 based on the tracking signal that is phase-locked on the phase beginning at 0. Therefore, in the first mechanical configuration, the phase locked onto begins with the tracking signal providing a positive magnetic dipole moment (as illustrated in FIG. 1). In the second mechanical configuration, tracker electronics 340 has phase locked onto the same phase of the tracking signal (instead of being off by 180° or $\pi$, as with current systems and methods) and begins measuring the tracking signal beginning with a negative magnetic dipole moment (as illustrated in FIG. 2). Therefore, tracker electronics 340 is able to distinguish between the first and second mechanical configurations.

In an embodiment, EM tracker 335 is a transmitter capable of transmitting auxiliary data. For example, EM tracker 335 may transmit auxiliary data unrelated to the EM tracking function. In image guided surgery applications, for example, such auxiliary data may report the type of surgical instrument the transmitter is attached to. In another example, such auxiliary data may communicate telemetered measurements of the environment of the transmitter, such as temperature, pressure, pH, and/or humidity. The auxiliary data may be communicated in a digital transmission.

EM tracker 335 may communicate the phase of the magnetic dipole moment or tracking signal that it is transmitting as a portion of auxiliary data. In other words, a portion of the auxiliary data transmitted by EM tracker 335 may include the phase of the tracking signal also transmitted by EM tracker 335. Tracking electronics 340 may receive this auxiliary data and use it to lock onto the proper phase of the tracking signal transmitted by EM tracker 335. By locking onto the proper phase of the tracking signal, tracking electronics 340 is able to distinguish between the two mechanical configurations, as described above.

In an embodiment, EM tracker 335 includes a transponder and system 300 includes an additional transmitter (not shown). For example, EM tracker 335 may include a passive-transponder EM tracker such as that disclosed in U.S. Patent Application Publication No. 20050012597, entitled "Wireless electromagnetic tracking system using a nonlinear passive transponder," in the case where the excitation signal transmitted by the additional transmitter is an amplitude-modulated, frequency-modulated, or phase-modulated excitation signal. The additional transmitter transmits auxiliary data to EM tracker 335. This auxiliary data includes a desired phase of the tracking signal transmitted by EM tracker 335.

EM tracker 335 receives the auxiliary data and transmits a tracking signal according to the desired phase of the auxiliary data.

Once EM tracker 335 transmits a tracking signal according to the desired phase (communicated via the auxiliary data), tracking electronics 340 may phase lock onto the proper phase of the tracking signal. Therefore, tracking electronics 340 may distinguish between the first and second mechanical configurations, as described above.

Figure 4:
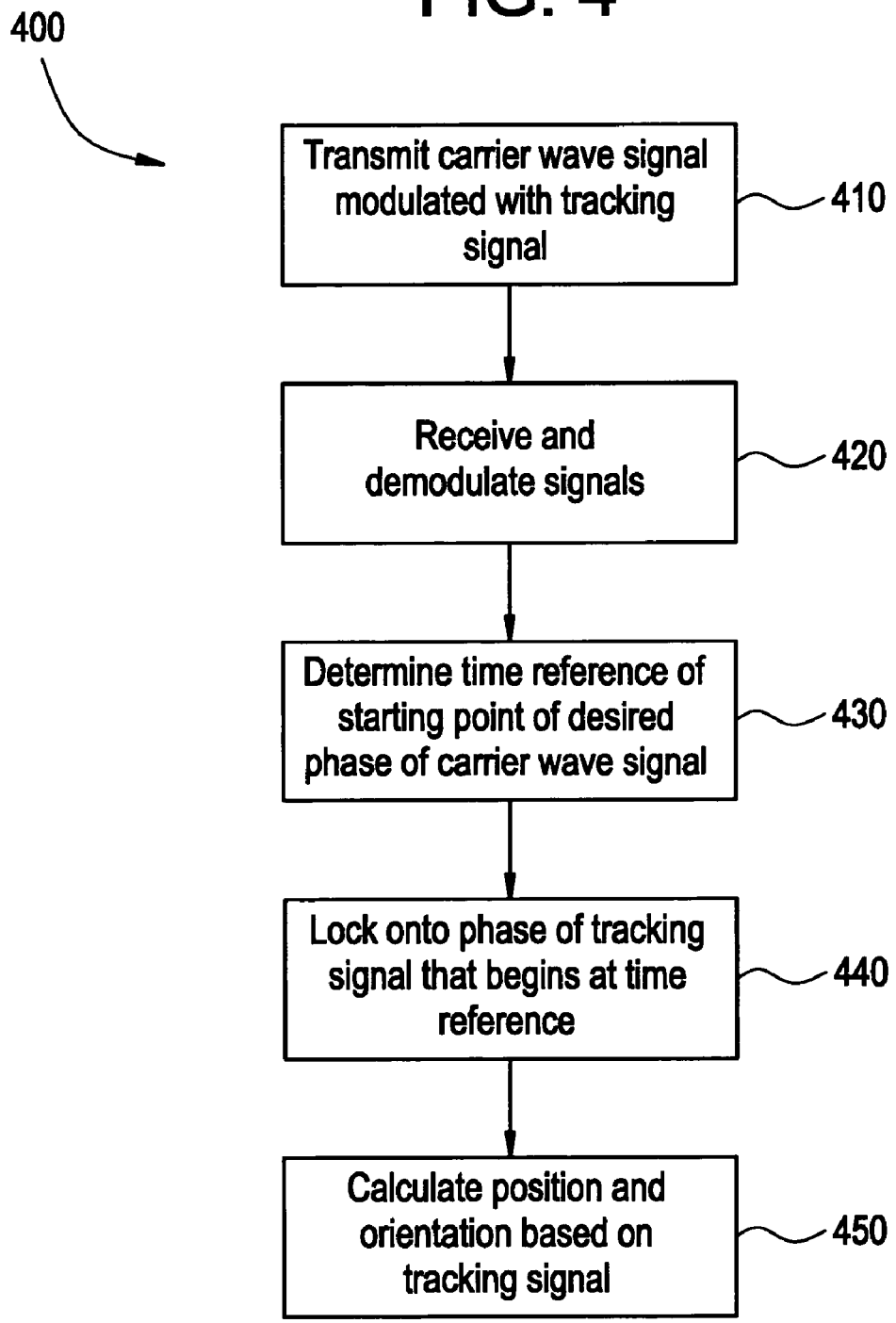
FIG. 4 illustrates a flowchart for a first method of disambiguating the phase of a field received from an EM tracker in an EM tracking system in accordance with an embodiment of the presently described technology.

FIG. 4 illustrates a flowchart for a first method 400 of disambiguating the phase of a field received from an EM tracker 335 in an EM tracking system 300 in accordance with an embodiment of the presently described technology. First, at step 410, a carrier wave signal is modulated with a tracking signal and is transmitted as described above.

Next, at step 420, the signals are received and the carrier wave signal is demodulated, as described above.

At step 430, a time reference is determined from the carrier wave signal. As described above, the starting point in time at which a desired or particular phase of the carrier wave signal is determined and is considered the time reference.

Next, at step 440, the phase of the tracking signal that begins at the time reference determined at step 430 is locked onto, as described above. This prevents locking onto an incorrect phase or a time-shifted phase, such as can occur with the first and second mechanical configurations described above.

Finally, at step 450, the position and orientation of EM tracker 335 is determined based on the measured tracking signal, as described above.

Figure 5:
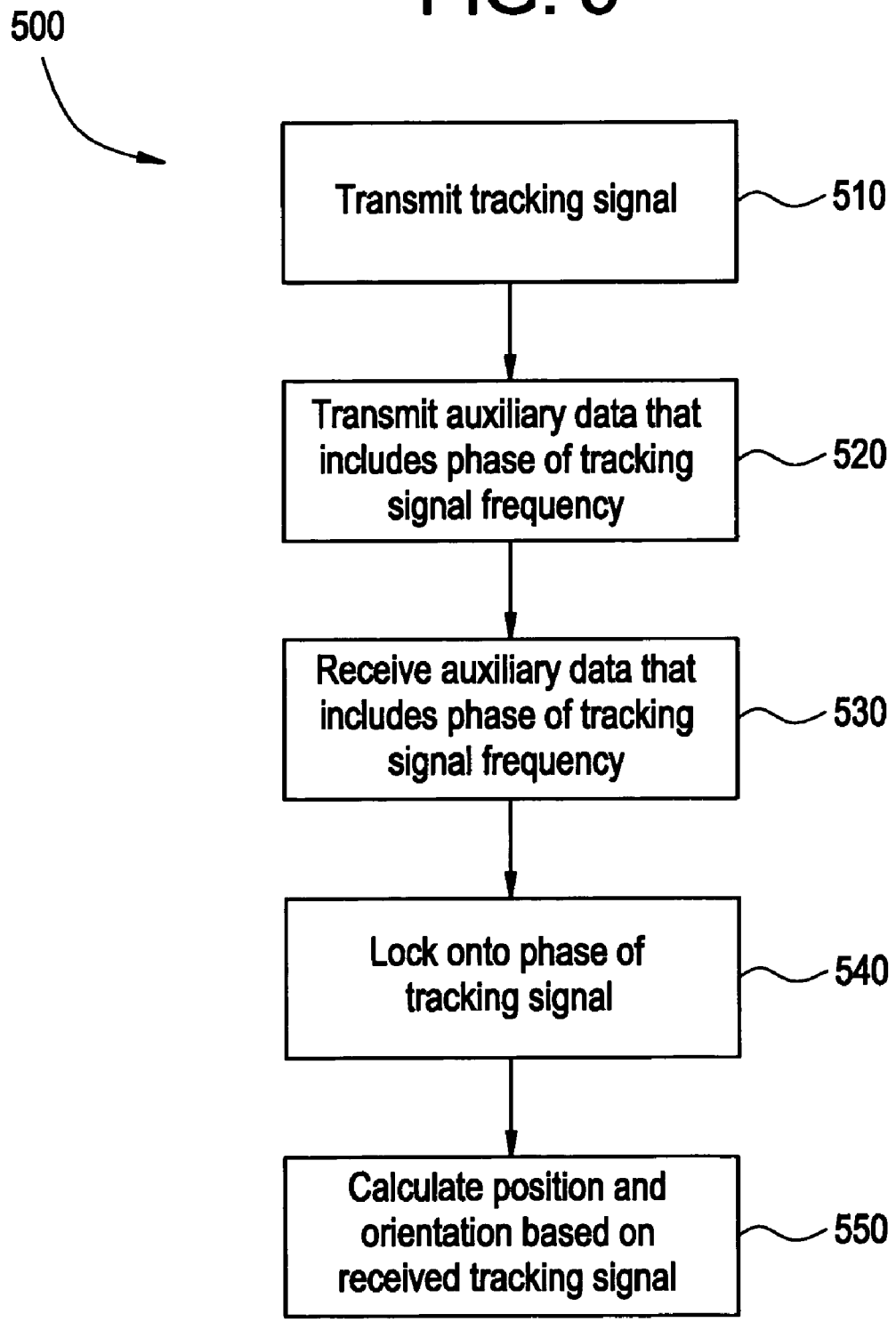
FIG. 5 illustrates a flowchart for a second method of disambiguating the phase of a field received from an EM tracker in an EM tracking system in accordance with an embodiment of the presently described technology.

FIG. 5 illustrates a flowchart for a second method 500 of disambiguating the phase of a field received from an EM tracker 335 in an EM tracking system 300 in accordance with an embodiment of the presently described technology. First, at step 510, a tracking signal is transmitted by EM tracker 335, as described above.

Next, at step 520, auxiliary data is transmitted by EM tracker 335. The auxiliary data can include the phase of the tracking signal transmitted by EM tracker 335, as described above. In an embodiment, the auxiliary data is digitally transmitted.

Next, at step 530, the auxiliary data that includes the tracking signal phase is received, as described above.

At step 540, the phase of the tracking signal is locked onto, as described above. This prevents locking onto an incorrect phase or a time-shifted phase, such as can occur with the first and second mechanical configurations described above.

Finally, at step 550, the position and orientation of EM tracker 335 is determined based on the measured tracking signal, as described above.

Figure 6:
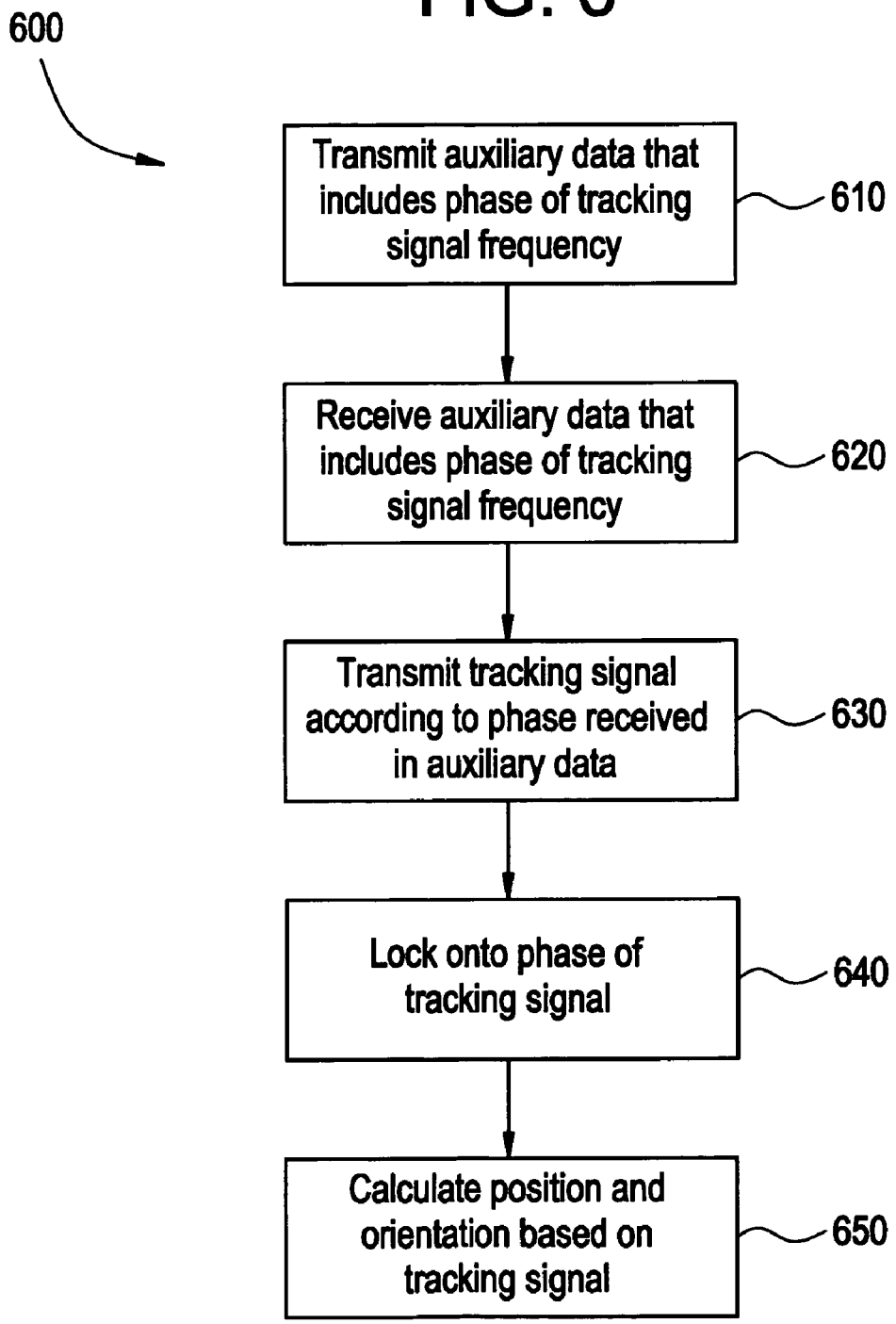
FIG. 6 illustrates a flowchart for a third method of disambiguating the phase of a field received from an EM tracker in an EM tracking system in accordance with an embodiment of the presently described technology.

FIG. 6 illustrates a flowchart for a third method 600 of disambiguating the phase of a field received from an EM tracker 335 in an EM tracking system 300 in accordance with an embodiment of the presently described technology.

First, at step 610, auxiliary data is transmitted to EM tracker 335, which includes a passive transponder. The auxiliary data can include a desired phase of the tracking signal transmitted by EM tracker 335, as described above. The auxiliary data may be included in an excitation signal transmitted to EM tracker 335. In an embodiment, the auxiliary data is digitally transmitted.

Next, at step 620, the auxiliary data that includes the desired tracking signal phase is received, as described above.

At step 630, a tracking signal is transmitted by EM tracker 335, as described above. The tracking signal is transmitted according to the phase received in the auxiliary data transmitted at step 610.

Next, at step 640, the phase of the tracking signal is locked onto, as described above. This prevents locking onto an incorrect phase or a time-shifted phase, such as can occur with the first and second mechanical configurations described above.

Finally, at step 650, the position and orientation of EM tracker 335 is determined based on the measured tracking signal, as described above.

While particular elements, embodiments and applications of the presently described technology have been shown and described, it is understood that the presently described technology is not limited thereto since modifications may be made by those skilled in the presently described technology, particularly in light of the foregoing teaching. It is therefore contemplated by the appended claims to cover such modifications and incorporate those features that come within the spirit and scope of the presently described technology.

What is claimed is:

1. A method of disambiguating the phase of a field received from a wireless tracker in an electromagnetic ("EM") tracking system, said method including:
transmitting a tracking signal using a single-coil EM tracker;
determining a starting point of a phase of said tracking signal using tracker electronics;
locking onto said phase of said tracking signal at said starting point using said tracker electronics;
measuring an EM field of said tracking signal based on said starting point of said phase using one or more single-coil EM receivers, said single-coil EM receivers among an array of single-coil EM receivers; and
determining a position and orientation of said single-coil EM tracker based on said EM field of said tracking signal using said tracker electronics.

2. The method of claim 1, wherein said tracking signal is represented as:

$$M = M_0 \sin(2\pi \cdot F \cdot t),$$

wherein M represents an EM field dipole moment vector of said tracking signal, $M_0$ represents a dipole moment positive peak value vector, F represents a frequency of said tracking signal, and t represents time.

3. The method of claim 1, further including:
modulating a carrier wave signal with said tracking signal, said carrier wave signal transmitted at a higher frequency than said tracking signal,
wherein said determining step includes determining a time at which a desired phase of said carrier wave signal occurs, said time being the same as said starting point of said phase of said tracking signal.

4. The method of claim 3, wherein said desired phase of said carrier wave signal includes 0 to π.

5. The method of claim 1, further including transmitting said phase of said tracking signal.

6. The method of claim 5, wherein said step of transmitting said phase of said tracking signal includes transmitting said phase digitally as a portion of transmitted auxiliary data.

7. The method of claim 5, wherein said steps of transmitting said tracking signal and transmitting said phase of said tracking signal are performed by a single-coil EM transmitter.

8. The method of claim 5, wherein said step of transmitting said tracking signal is performed by a single-coil EM transponder and further including receiving said phase of said tracking signal at said transponder.

9. The method of claim 8, wherein said step of transmitting said tracking signal includes transmitting said tracking signal beginning with said phase of said tracking signal received at said transponder.

10. An electromagnetic ("EM") tracking system configured to disambiguate the phase of a field received from a wireless tracker, said system including:
- a single-coil EM tracker configured to transmit a tracking signal;
- one or more single-coil EM receivers configured to measure an EM field of said tracking signal, said single-coil EM receivers among an array of single-coil EM receivers; and
- tracker electronics configured to perform the following steps:
  - determining a starting point of a phase of said tracking signal;
  - locking onto said phase of said tracking signal based on said starting point; and
  - determining a position and orientation of said single-coil EM tracker based on said EM field of said tracking signal.

11. The system of claim 10, wherein said tracking signal is represented as:

$$M = M_0 \sin(2\pi \cdot F \cdot t),$$

wherein M represents an EM field dipole moment vector of said tracking signal, $M_0$ represents a dipole moment positive peak value vector, F represents a frequency of said tracking signal, and t represents time.

12. The system of claim 10, wherein said single-coil EM tracker is configured to modulate a carrier wave signal with said tracking signal at a higher frequency than said tracking signal and said tracker electronics is configured to determine a time at which a desired phase of said carrier wave signal begins, said time being the same as said starting point of said phase of said tracking signal.

13. The system of claim 12, wherein said desired phase of said carrier wave signal includes 0 to $\pi$.

14. The system of claim 10, wherein said EM tracker is configured to transmit said phase of said tracking signal.

15. The system of claim 14, wherein said EM tracker is configured to transmit said phase of said tracking signal digitally as a portion of transmitted auxiliary data.

16. The system of claim 14, wherein said EM tracker is a single-coil EM transmitter.

17. The system of claim 14, further including a transmitter configured to transmit a desired phase of said tracking signal, wherein said EM tracker is an EM transponder configured to receive said desired phase of said tracking signal.

18. The system of claim 17, wherein said transponder is configured to transmit said tracking signal beginning with said desired phase of said tracking signal received at said transponder.

19. A tracking apparatus for use in an electromagnetic ("EM") tracking system, the tracking apparatus comprising:
- an EM tracker configured to transmit a tracking signal;
- one or more single-coil EM receivers configured to measure an EM field of said tracking signal, said single-coil EM receivers among an array of single-coil EM receivers; and
- tracker electronics configured to determine a starting point of a phase of the tracking signal, lock onto the phase of the tracking signal based on the starting point, and determine a position and orientation of the EM tracker based on the EM field of the tracking signal, said phase determined by one or more of the following steps:
- analyzing a carrier wave signal transmitted by said EM tracker to determine a time at which a desired phase of said carrier wave signal begins, said time also indicating the starting point of said phase of said tracking signal;
- receiving said phase of said tracking signal as transmitted by said EM tracker; and
- communicating said phase of said tracking signal to a transmitter configured to transmit said phase to said EM tracker, wherein said EM tracker is configured to receive said phase and transmit said tracking signal beginning at said phase.

20. The apparatus of claim 19, wherein said EM tracker is one or more of a single-coil EM transmitter and an EM transponder.

* * * * *

UNITED STATES PATENT AND TRADEMARK OFFICE
CERTIFICATE OF CORRECTION

PATENT NO.       : 7,640,121 B2                                    Page 1 of 1
APPLICATION NO.  : 11/290117
DATED            : December 29, 2009
INVENTOR(S)      : Peter Traneus Anderson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this

Ninth Day of November, 2010

David J. Kappos
*Director of the United States Patent and Trademark Office*